United States Patent Office 3,514,937
Patented June 2, 1970

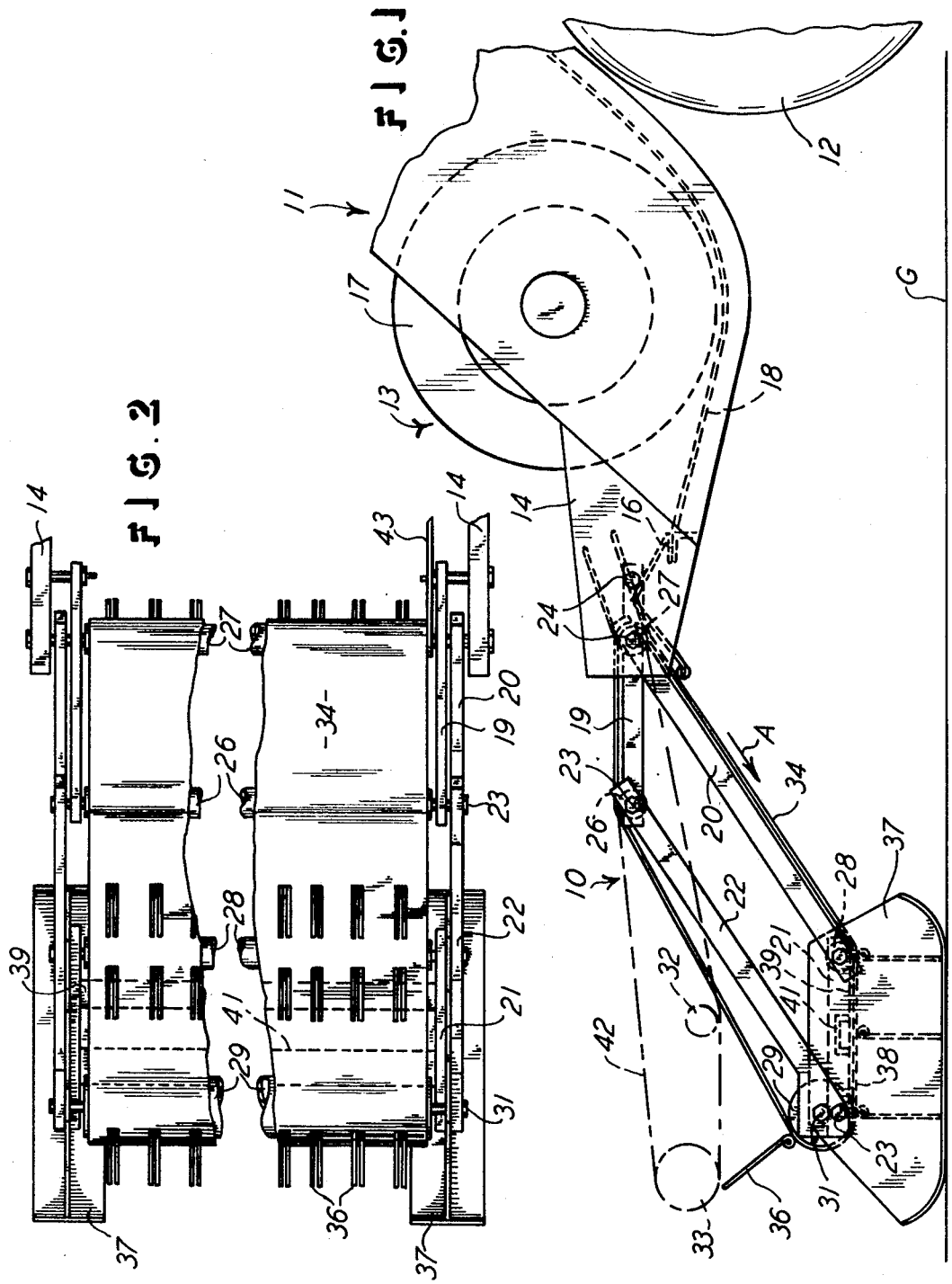

3,514,937
CROP PICKUP MECHANISM
Stephen L. Batog, Moline, Ill., assignor to J. I. Case Company, Racine, Wis., a corporation of Wisconsin
Filed Feb. 5, 1968, Ser. No. 703,158
Int. Cl. *A01d 87/04*
U.S. Cl. 56—345                         3 Claims

ABSTRACT OF THE DISCLOSURE

A crop pickup mechanism for pivotally mounting on a harvester machine, or the like, in front of the machine and having support structure pivotally mounted to the machine. Crop pickup fingers are supported on a belt moveably mounted on the support structure for sweeping the ground and conveying the crop into the machine. The belt has a horizontally extended portion disposed adjacent the ground for presenting the fingers to the ground along a distance fore-and-aft of the machine for complete and uniform pick up of crop. Also, the support structure is arranged to maintain the belt taut and to maintain the horizontal belt portion in a horizontal position, with both features being achieved throughout all pivoted positions of the pickup mechanism with respect to the harvester machine.

BACKGROUND OF THE INVENTION

This invention relates to a crop pickup mechanism for mounting forwardly of a harvester machine and picking crop off the ground and conveying it into the harvester.

Pickup mechanisms are commonly known in the form of draper attachments for harvesting machines. These drapers or mechanisms are used for operating over the field for picking up crop that has been previously cut but left lying on the ground. This type of pickup function commonly requires special attention for accomplishing a thorough and uniform pick up of the crop and for feeding it to the harvester machine.

The prior art therefore recognizes the problems of complete pick up of the previously cut crop and of conveying the crop to the harvester in uniform speed in accordance with the ground speed of the harvester so that the harvesting equipment will have the crop fed into it in a uniform quantity and speed. Also, the prior art recognizes the problem of achieving the foregoing while utilizing pivotal draper-type mechanism which adjusts to the changes in elevation in the ground. The present invention provides the answers to the aforesaid problems, and it does so with equipment which can be readily and easily manufactured and mounted on a harvester machine.

More specifically, the present invention provides a draper-type pickup mechanism which has a horizontally disposed pickup portion for sweeping over the ground in several passes thereover, as the entire machine advances along the ground. That is, the pickup fingers extend along a horizontally disposed section of the belt so that several fingers go along the same line with respect to the forward direction of the machine. Still further, this object of thorough raking of the ground is accomplished at the same time that the draper mechanism is pivotally disposed to adjust to the ground, and the mechanism also continues to present several of the raking fingers to each portion of the ground being cleaned. Also, the support structure for the belt supporting the pickup fingers is arranged so that the belt remains taut regardless of pivotal position of the draper, and therefore the belt moves at a uniform speed both for picking up the crop and for delivering it into the harvester so that uniform feeding into the harvester is accomplished.

BRIEF DESCRIPTION OF THE DRAWING

FIG. 1 is a side elevational view of the pickup mechanism of this invention, with the dot-dash lines showing a second position of the mechanism, with the forward portion of a harvester machine fragmentarily shown.

FIG. 2 is a top plan view of the pickup mechanism shown in FIG. 1, with certain parts removed, and with most of the harvester machine removed.

DETAILED DESCRIPTION OF THE PREFERRED EMBODIMENT

A draper type of pickup mechanism, generally designated 10, is pivotally supported on the forward end of a harvesting machine, generally designated 11. The entire assembly is shown to be operable along the ground designated G, as the harvester machine wheel 12 would be supported on the ground for presenting the crop-processing mechanism, generally designated 13 forwardly of the machine 11. Therefore, the machine 11 may be of any conventional crop-processing type, and it will also be understood that the crop (not shown) has been cut and is lying on the ground waiting to be picked up by the mechanism 10 and fed into the crop-processing equipment 13. Thus harvester members 14 enclose the harvester sickle cutter and guard located at 16, and an auger conveyer 17 is rotatably disposed in the machine 11 and acts on the trough 18. These parts just described are conventional parts and are the parts forming the crop-processing equipment designated 13 in the harvesting machine.

The draper mechanism 10 is in the form of an attachment mountable on the machine 11 to be pivoted thereon to therefore adjust for relative elevated positions between the machine 11 and mechanism 10, as determined by the level of the ground. The mechanism 10 includes a support structure comprised of four pieces or bars designated 19, 20, 21, and 22. The four pieces are pivoted with respect to the machine 11, and they are also pivoted with respect to each other by means of the connecters or bolts 23 extending through the ends of each of the four pieces. Also, the bar 19 is essentially fixed with respect to the harvester 11, by means of the connecters or bolts 24 extending through the bar 19 and the harvester member 14 or a like structural or frame member of the harvester 11.

The support structure described carries four rollers 26, 27, 28, and 29, with the rollers 26, 27, and 28 being located on the pivot axes between the respective pieces described. The roller 29 is shown larger and has a mounting bolt 31 on the piece 22.

It will therefore be understood that the four pieces 19, 20, 21, and 22 form a four-bar linkage-type of support structure and they are in the shape of a rhombus. It will therefore now also be apparent that any vertical pivotal movement of the lower three bars 20, 21, and 22 will cause the bar 21 to remain in its orientation with respect to the horizontal direction or plane, that is, the bar 21, and likewise the centers of rotation for the rolls 28 and 29, remain in their horizontal orientation regardless of pivoted position of the mechanism 10. Thus the dot-dash lines designated 32 and 33 respectively show the positions of the rollers 28 and 29 when the mechanism 10 is in the dot-dash position, and such positions 32 and 33 are still in the horizontal orientation, as desired.

A conveyor belt 34 is trained over the four rollers described and extends endlessly thereover and carries spring-biased fingers 36 generally extending transverse to the belt 34. The fingers 36 are therefore available for sweeping over and raking the ground to pick up the crop as the belt is driven in the direction of the arrow designated A in FIG. 1. A ground-engaging mechanism, in the form of a skid 37, is connected with the support structure described, and it therefore supports the forward end of the pickup attachment or mechanism 10 on the ground. This therefore provides a floating-type of support for the pickup 10 at its forward end where it is initially engaging the ground and the crops thereon for moving the crops into the machine 11 by passing the crops along the rearward end of the pickup 10, and such rearward end being that end attached to the machine 11 at the bolts 24.

An important feature of the embodiment is the provision of a horizontally extended length, generally designated 38, of the belt 34. FIG. 1 shows that this horizontally extended length presents three spring fingers 36 to the ground for raking the ground along the same portion thereof so that the ground can be thoroughly cleared and picked up. A back-up plate 39 is included in the support structure and is disposed above the belt horizontal portion 38 for supporting the latter. Also, a channel 41 is secured to the back-up plate 39 for reinforcing the plate in its support of the belt horizontal portion 38. Of course the horizontal portion 38 is that portion of the belt 34 which is exposed to the ground and therefore receives the upward pressure from the spring fingers 36 as they act along the ground and on the crop lying thereon.

Again it will be noted that when the entire unit of the mechanism 10 and the harvester 11 is in a position so that relative thereto the belt 34 may be in the dot-dash position shown by means of lines 42, then the horizontal portion 38 still remains horizontal for uniform and even pick up of crop from the ground and for complete pickup of the crop.

Also, the belt 34 will remain taut since the distances between the centers of the four rollers will always remain the same, by virtue of the four-bar linkage. Thus all of the rollers are axially fixedly spaced apart on the support structure so that regardless of pivotal position of the structure, the belt remains taut as the distance between the rollers remains the same.

FIG. 2 indicates that the upper roller 27 may be driven by a belt or the like 43 extending from the machine 11 from whence the attachment 10 will get its power.

What is claimed is:

1. In a crop pickup attachment for a harvester machine for picking crops off the ground and conveying them from one end of said attachment to the other end of said attachment and then to the harvester machine, a support structure, horizontally disposed rollers rotatably mounted on said support structure, an endless belt tautly trained on said rollers for movement with the rotation of said rollers, picking fingers attached to said belt and extending therefrom, mounting means included in said attachment at said other end for vertically pivotally mounting said attachment on a harvester machine and with said attachment extendable forwardly of the harvester machine, ground-engaging members included in said pickup attachment for ground-supporting the latter at its said one end in its extent forward of the harvester machine, the improvement comprising all said rollers being axially fixedly spaced apart on said support structure for maintaining said belt taut, two of said rollers being arranged and disposed with the lowermost surfaces thereof being disposed on a common horizontal plane, said endless belt including a horizontally disposed length tautly extending between said lowermost surfaces for presenting said fingers to the ground throughout said horizontally disposed length, said support structure including a plurality of members pivoted together and arranged in the form of a rhombus to form a four-bar type of structure, said two rollers being axially disposed on two of the pivot axes of said members for retaining said horizontally disposed length of said belt taut and horizontal in all pivoted positions of said support structure.

2. The subject matter of claim 1, including a back-up member connected with said support structure and disposed above said horizontally disposed length of said belt for supporting the latter against upward forces.

3. The subject matter of claim 1, wherein said rollers are four in number and are disposed with one at each of the pivotal connections for said support structure for retaining said belt taut in all pivoted positions of said members.

References Cited

UNITED STATES PATENTS

| 2,600,992 | 6/1952 | Kearse | 56—345 XR |
| 2,664,691 | 1/1954 | Wiebe | 56—328 |
| 2,732,678 | 1/1956 | Blaser et al. | 56—364 |
| 2,795,100 | 6/1957 | Sund | 56—364 |
| 3,229,454 | 1/1966 | Oshanyk | 56—364 |

ANTONIO F. GUIDA, Primary Examiner